United States Patent
Nakayama et al.

(10) Patent No.: US 6,907,001 B1
(45) Date of Patent: Jun. 14, 2005

(54) PACKET SWITCH FOR SWITCHING VARIABLE LENGTH PACKETS IN THE FORM OF ATM CELLS

(75) Inventors: Kaori Nakayama, Yokohama (JP);
Mitsuhiro Wada, Yokohama (JP);
Takayuki Kanno, Fujisawa (JP);
Nobuyuki Yamamoto, Yokohama (JP);
Makoto Matsuoka, Yokohama (JP);
Yusho Futami, Yokohama (JP);
Takahiko Kozaki, Ohta-ku (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/262,839

(22) Filed: Mar. 5, 1999

(30) Foreign Application Priority Data

Nov. 12, 1998 (JP) .......................................... 10-321706

(51) Int. Cl.[7] .............................. H04J 3/14; H04L 12/28
(52) U.S. Cl. .............. 370/230; 370/395.42; 370/395.52
(58) Field of Search ................................ 370/229, 230, 370/230.1, 235, 236, 395.4, 395.42, 395.5, 395.52, 395.6, 395.63, 395.65, 413–419, 370, 380, 395.7, 395.71, 401, 412

(56) References Cited

U.S. PATENT DOCUMENTS

| | | | |
|---|---|---|---|
| 5,475,679 A | * 12/1995 | Munter | .................... 370/395.4 |
| 5,550,823 A | * 8/1996 | Irie et al. | .................... 370/413 |
| 5,577,035 A | * 11/1996 | Hayter et al. | ............. 370/395.4 |
| 5,790,522 A | * 8/1998 | Fichou et al. | ................ 370/236 |
| 6,011,779 A | * 1/2000 | Wills | .......................... 370/236 |
| 6,115,373 A | * 9/2000 | Lea | ............................ 370/355 |
| 6,144,635 A | * 11/2000 | Nakagawa | ................... 370/229 |
| 6,205,145 B1 | * 3/2001 | Yamazaki | ............. 370/395.65 |
| 6,351,466 B1 | * 2/2002 | Prabhakar et al. | .......... 370/413 |

OTHER PUBLICATIONS

Craig Patridge et al, A 50–Gb/s IP Router, Jun. 1998, IEEE, EEE/ACM Transactions on Networking, vol. 6, No. 3,pp. 237–248.*

* cited by examiner

*Primary Examiner*—Ricky Ngo
*Assistant Examiner*—Soon D. Hyun
(74) *Attorney, Agent, or Firm*—Mattingly, Stanger, Malur & Brundidge, ,P.C.

(57) ABSTRACT

A packet switch which includes input line interfaces for converting variable length packets received from input lines to fixed length cells, a switch unit for switching said packets in cell units, output line interfaces for converting output cells from the switching unit to variable length packets and transmitting the variable length packets over output lines. Each of the input line interfaces has a cell output controller for queuing the fixed length cells for each output line according to the degree of priority of the cells, and for selectively outputting the stored cells in the queues in order of priority, thereby to suppress the transmission of cells with a low priority during the times of congestion.

10 Claims, 15 Drawing Sheets

PACKET SWITCH FOR SWITCHING VARIABLE LENGTH PACKETS IN THE FORM OF ATM CELLS

BACKGROUND OF THE INVENTION

1. Field of the Invention

This invention relates to a packet switch and in particular to a packet switch in communication networks for switching variable length packets such as typified by IP (Internet protocol) packets.

2. Description of Related Art

In recent years, in Internet Protocol (-hereafter referred to as IP), message transfer or forwarding is performed by packets called IP datagrams (hereafter referred to as IP packets). In a conventional IP network, node equipment such as a router installed within the network, transfers a received packet to adjacent node equipment along a selected path according to the respective destination addresses in the order that the packet was received. The IP network makes a best possible effort to transfer the message to the destination terminal but cannot guarantee factors in communications performance such as delay time in the message transfer.

In each node within the IP network, the IP headers of the packets received from the input line are analyzed by the respective input line interfaces, and the output line interface to which this packet must be forwarded is identified according to the routing information contained in the IP header, and these received packets are relayed in sequence to one of output line interfaces corresponding to respective destinations by way of the switching unit.

There has been proposed a node equipment to forward IP packets at high speed, in a paper entitled, "A 50-Gb/s IP Router" (Craig Partridge et. al., IEEE/ACM TRANSACTIONS ON NETWORKING, Vol. 6, No. 3, June 1998).

This node equipment has a configuration in which a plurality of line cards (line boards) supporting one or more of network interfaces and a forwarding engine cards provided with a routing table are coupled to point-to-point switches typified, for example, by crossbar switches. Each of said line cards transmits a data block including the header of the received packet to the forwarding engine, the remainder of the packet remains on the inbound line card. A data block containing new header information rewritten by the forwarding engine is sent back to the inbound line card, and each inbound line card forwards the data block containing the new header information and data blocks containing the remainder of the received packet to the outbound line card for transmission.

The above paper discloses that each of inbound line cards segments the received packet up into linked pages (data blocks) of 64 byte units, and each of the outbound line cards assembles these pages into a linked list for each packet, and delivers the assembled packet to a QoS processor. The above paper further discloses that the QoS processor then places the packet into an appropriate position within a transmission queue based on the packet length, destination and flow identifiers specified by the forwarding engine, and that the packet is discarded without queuing during the occurrence of congestion.

Along with the spread of the Internet, increasing demands are being in the support of real time communication service typified by audio and video as well as communications services for data information handled by a conventional computer. However, the relay delay time for the packet received at a node must be shortened as much as possible in order to provide effective support in terms of real time information communications.

However, in node equipment of the conventional art, once the forwarding operation of packet data to an output line interface begins, other IP packets cannot be forwarded to the same output line interface until the forwarding of the previous packet has been completed, because the forwarding operation of data from each input line interface to a switching unit or to one of the output line interfaces is performed in units of variable length packets. In the same way, when once the input line interface begins the data transfer of one IP packet, until forwarding of all data for that packet has been completed, the interface cannot switch the transfer object to the other IP packets that need to be sent.

Consequently, in conventional node equipment, while an IP packet from a data communication service which does not have a problem with delay time is being forwarded to one output line interface, another IP packet, even if it is from a communication service for real time information that needs to be forwarded to the same output line interface, has to wait until forwarding of the preceding IP packet is completed. In particular, when a large data length of IP packet is being forwarded, there creates the problem of a large relay delay for subsequent packets.

In the above mentioned IEEE paper, the packet was segmented into pages of 64 bytes each at the inbound line card and then output to the switch. However, since the inbound line card, prior to forwarding a packet, must negotiate with the outbound line card by way of a switch allocator in order to start the forwarding operation after confirming that the outbound line card has acknowledged the receiving of the packet. Once the forwarding of page data for one packet starts, this operation continues without any interruption. Therefore, the switch in effect, relays the data in packet units.

Further in the above mentioned paper, the packet is discarded by the QoS processor in the outbound line card when the output queue is congested so controlling operation to avoid congestion is a problem.

SUMMARY OF THE INVENTION

In view of the above, this invention has an object to provide node equipment and a packet switch capable of controlling the forwarding of variable length packets according to the order of priority.

Another object of this invention is to provide node equipment and a packet switch for receiving variable length packets of different service classes and in particular capable of shortening the relay delay time by controlling the forwarding of packets according to the order of priority in the case of receiving packets of service classes requiring real time handling.

Still another object of this invention is to provide node equipment and a packet switch having a function for sending variable length packets with a high priority in order to pass ahead of previous variable length packets with a low priority to the target output line.

Yet another object of this invention is to provide node equipment and a packet switch capable of achieving a simple QoS (Quality of service) function.

A further object of this invention is to provide node equipment and a packet switch that do not discard the packet due to congestion and are capable of relaying packets with a high order of priority to an output line with a small delay time.

In order to achieve the above objects, node equipment and a packet switch according to the present invention is constructed to convert the variable length packets received from input lines into fixed length cells by each input line interface, perform switching of the packet in cell units in the switching unit, and then convert output cells from the switching unit to original variable length packets by each output line interface. The above mentioned input line interface has a cell output controller to store the fixed length cells converted from the variable length packets into a plurality of queues corresponding to the output lines and to selectively output the stored cells from said queues according to the order of priority.

According to the above configuration of the present invention, when congestion for instance has occurred within the packet switch, by notifying the congested status to each interface and by selectively controlling the forwarding of remaining cells to the congested paths by said mentioned controller according to the order of priority of each cell in the queue, a worsening of the congestion can be avoided.

For packets of a service class demanded with real time transmission such as audio packets, the cells may be given a high priority in order to forward to the object output line without a large increase in delay time resulting from the congestion. Further, the notification of the congested status can be realized, for example, by monitoring cell queues for each of the output lines in the switching unit or by monitoring packet assembly buffers in each output line interface in order to generate information of congestion status classified by the priority of cells for each output line and to deliver the status information in specific periods to each input line interface.

These and other objects, features and advantages of the present invention will become more apparent in view of the following detailed description of the preferred embodiments in conjunction with the accompanying drawings.

DETAILED DESCRIPTION OF THE PREFERRED EMBODIMENTS

Hereafter, the various embodiments of the invention are described by referring to the accompanying drawings. Here a description is given for cases where the variable packet for conversion is an IP packet. However, this invention may also be adapted for packets other than Internet protocol.

Figure 1:
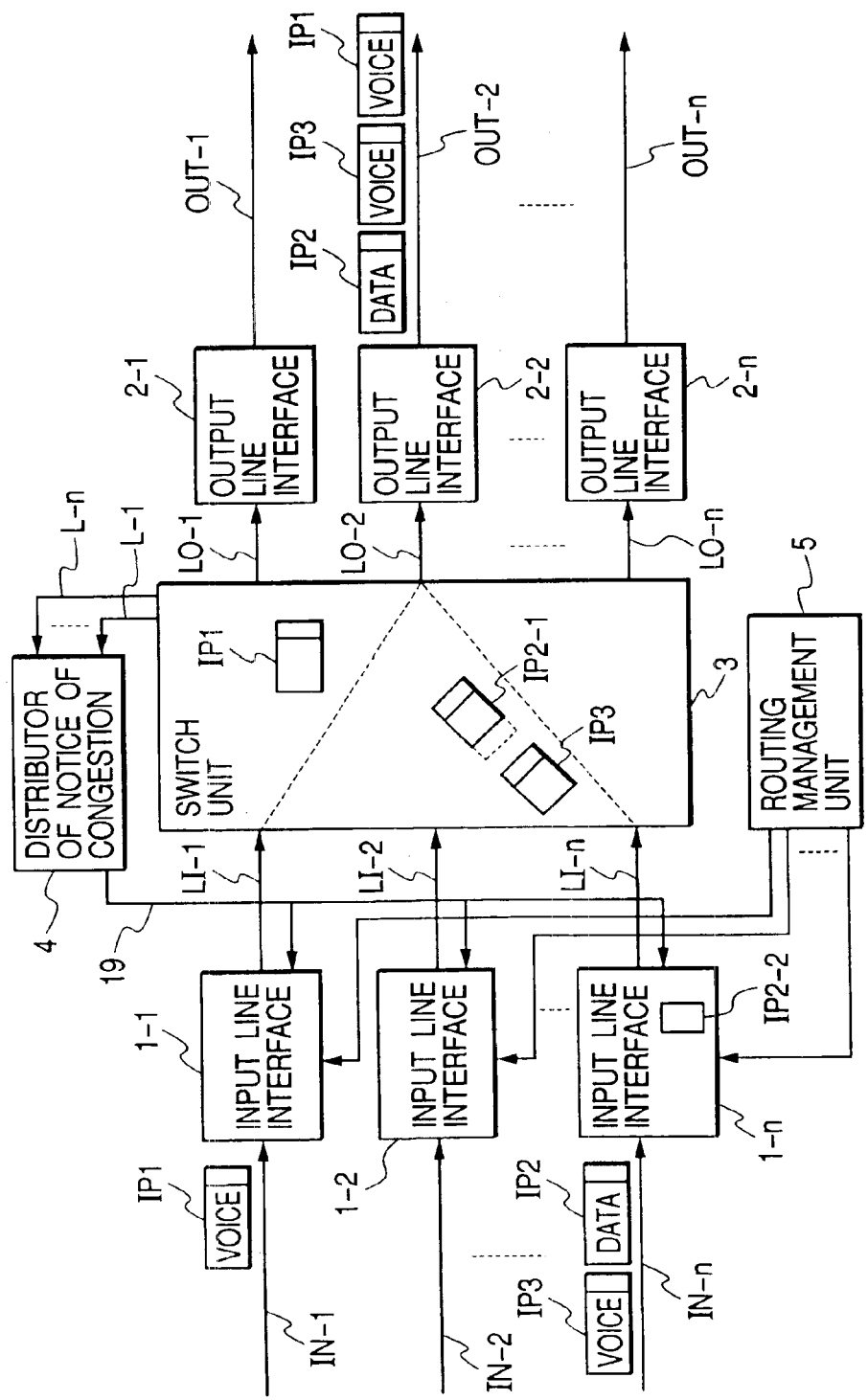
FIG. 1 is a block diagram showing a first embodiment of the packet switch of this invention.

FIG. 1 shows the first embodiment of the packet switch of this invention.

A packet switch comprises a plurality of input line interfaces 1 (1—1 to 1-$n$) connected to input lines IN (IN-1 to IN-n) for converting the IP packet received from the input lines to one or more fixed length cells and sending the cells to switch input ports LI (LI-1 to LI-n); a switching unit 3 having a plurality of input ports LI-1 to LI-n and output ports LO-1 to LO-n and switching the input cells from the input ports to any one of the output ports specified by the routing information contained in each of the cell headers; a plurality of output line interfaces 2 (2-1 to 2-$n$) each connected to one of the switch output ports to restore the original IP packet from the cells received from the output port and send that IP packet to the output line OUT (OUT-1 to OUT-n) associated therewith; a congestion notifier unit (a distributor of notice of congestion) 4 to inform each input line interface 1 of the congestion status in the switching unit 3; and a routing management unit 5 connected to the input line interfaces 1 in order to manage the routing information of IP packets received from each input line.

The future of the packet switch of this invention resides in that when a plurality of packets destined for the same output port are input simultaneously partially over a time base from a plurality of input lines and then the quantity of stored cells destined for a specified output port exceeds a predetermined threshold value within the switch, the input line interfaces sending the cells destined for the specified output port selectively inhibits the forwarding or sending out of cells according to the order of priority of the cells in response to the notice of congestion informed to each of the input line interfaces from the congestion notifier 4 by way of the signal line 19.

In the congestion control process, a plurality of threshold values may for instance be assigned to the cell queues formed for each output port in the switching unit 3, and at the point where the quantity of the stored cells for a specified output port reaches a first threshold value Th1, the low priority cells destined for the specified output port is prohibited from flowing into the switching unit 3 and upon reaching a second threshold value Th2, the high priority cells destined for the specified output port is also prohibited from flowing into the switching unit 3 and once the number of cells stored for the specified output port has sufficiently decreased due to prohibiting the supply of cells to the switching unit, the suppression of the input of cells to the switch unit may be canceled to once again allow the cells to flow into the switching unit 3 in the order of high priority cells first.

Further, if a plurality of cell queues are formed in the order of priority for each output port in the switching unit, individual threshold values may for instance be assigned to each queue so that input of cells can be selectively prohibited at one of these queues that was determined as a congested queue because the number of stored cells has exceeded a predetermined threshold value. Congestion status as referred to in this specification, indicates such a state that the number of stored cells have exceeded or reached a predetermined threshold value or not and does not necessarily indicate such a state that requires to discard new incoming cells.

In the packet switch as for instance shown in FIG. 1, it is assumed that a high priority audio service class packet IP1 received from the input line IN-1 and a low priority data service class packet IP2 received from the input line IN-n are both destined for the same output line OUT-2 (or output port LO-2). These packets are converted into fixed length cells at the respective input line interfaces 1—1 and 1-n, then input to the switching unit 3 from the input ports LI-1 and LI-n, and temporarily stored in the same cell queue corresponding to the output port LO-2.

In the switching unit 3, a write cycle for inputting a cell from selected one of the input line interfaces to the switching unit 3 and a read cycle for outputting a stored cell from the switching unit to one of the output line interfaces are assigned alternately. The read cycles are repeated so that stored cells are delivered one by one to the output ports LO-1 to LO-n in turn. Since each output port can output one cell per N read cycles, the number of stored cells gradually increases in the cell queue for the output port LO-2 which is being supplied with cells from a plurality of input ports LI-1 and LI-n.

In this embodiment, the quantity of stored cells in each cell queue formed in the switch 3 is monitored and that status is notified to each input interface 1 by the congestion notifier 4 via a signal line 19, and when the stored cells in the cell queue for the output ports LO-2 reaches (or exceeds) the first threshold value, the supply of cells destined to the output port LO-2 is suppressed by the input line interfaces 1—1 through 1-n. This suppression of cell supply is controlled by means of the degree of priority of the packet that each cell transports. In the example shown in the drawing, the input line interface 1-n which is outputting low priority cells of packet IP2 functions to stop the output of cells, and the input line interface 1—1 which is outputting high priority cells of packet IP1 functions to continue the output of cells. This prohibition or restriction on the supply of cells to the switching unit 3 by the input interface line 1-n improves the balance of input cells versus output cells in the output queues for the output port LO-2 and prevents the output queue from accumulating the cells to a point that might trigger discarding of cells.

In this embodiment, since the input line interfaces output the received packets in cell units to the switching unit 3 and the switching unit 3 then forwards the packets in cell units, it is able to make the input line interface 1-n that is forwarding the cells for the packet IP2 to stop the output of cells in response to the notice of congestion received from the congestion notifier 4, and to hold the remaining portion IP2-2 of the packet in a buffer until the current status recovers. If a high priority audio service packet IP3 is received from the input line IN-n in this state, the input line interface 1-n can commence the transmission of the cells for the newly arrived packet IP3 while the remaining portion IP2-2 of the preceding low priority packet is left unchanged . Consequently, according to the present invention, such an advantageous packet transfer is realized that a newly arrived high priority packet IP3 can overtake the previously arrived low priority packet IP2 at the input line interface.

Since the output line interface 2—2 connected to the output port LO-2 stores the cells received from the switching unit 3 into separate queues prepared for individual packets and forwards a packet restored from a series of stored cells put in order from a lead cell to an end cell of the packet, the output packets appear in the order of IP1, IP3, IP2 on the output line OUT-2.

In the above example, it is assumed that the subsequent packet IP3 and preceding packet IP2 are destined for the same output line. However the same operation is carried out if the subsequent packet IP3 and preceding packet IP2 are heading for different output lines. This packet forwarding process allows the switching of high priority service class packets with a minimum time delay when the switching unit 3 falls into a congestion status.

Figure 2:
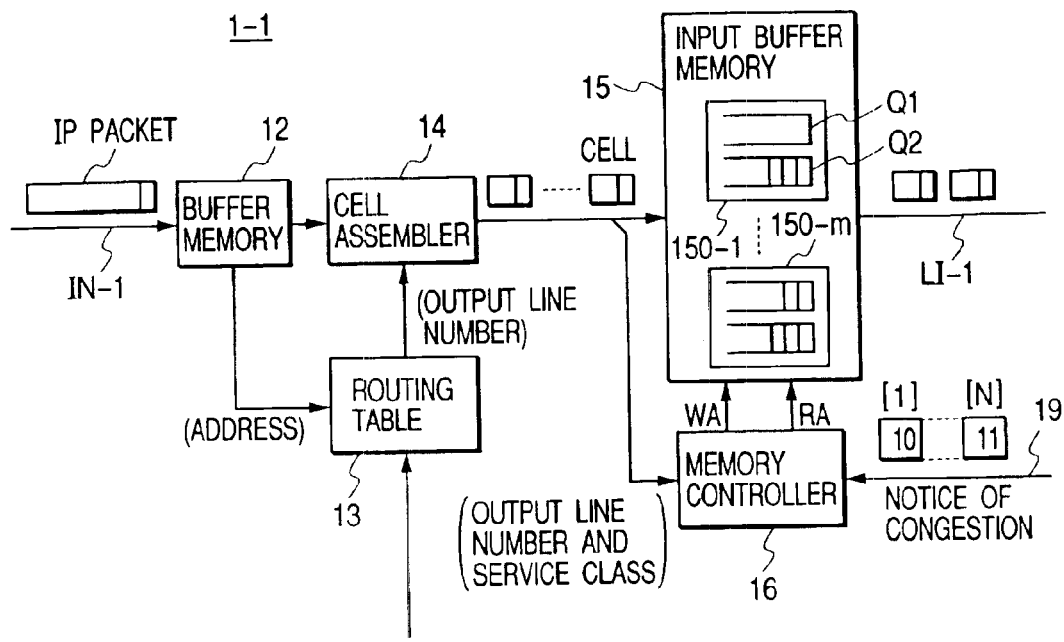
FIG. 2 is a block diagram showing the configuration of the input line interface 1—1 of FIG. 1—1.

FIG. 2 is a block diagram showing the configuration of the input line interface 1—1 of FIG. 1.

The input line interface 1—1 comprises a buffer memory 12 for temporarily storing the packet (IP packet) received from the input line IN-1; a routing table 13 for storing cell header information corresponding to the header information of respective input packets; a cell assembler 14 to segment the packets read out from the buffer memory 12 into a plurality of fixed length data blocks and add the cell header information read out from the routing table 13 to each of the data blocks thereby to produce internal ATM cells; an input buffer memory 15 for queuing the internal cells assembled by the cell assembler 14 into buffer areas prepared for each service class and for each output line; and a memory controller 16 for controlling the read/writ operation of cells in buffer memory 15. The memory controller 16 constitutes the cell output controller of this invention.

Figure 3:
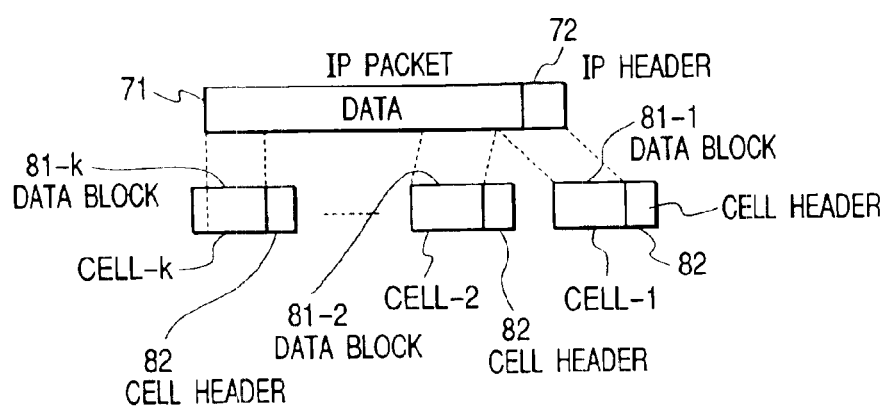
FIG. 3 is a drawing showing the interrelation of the internal cell and the variable length packet (IP packet) input to the packet switch of this invention.

The variable length packet IP input to the buffer memory 12 from the input line IN-1 comprises a data field 71 and an IP header 72 as shown in FIG. 3. The cell assembler 14 segments the input packet into a plurality of data blocks 81-1 to 81-k with a fixed length of 48 byte or 64 byte, and by adding a cell header 82 to each data block, the data blocks are converted into internal ATM cells CELL-1 to CELL-n.

Figure 4A:
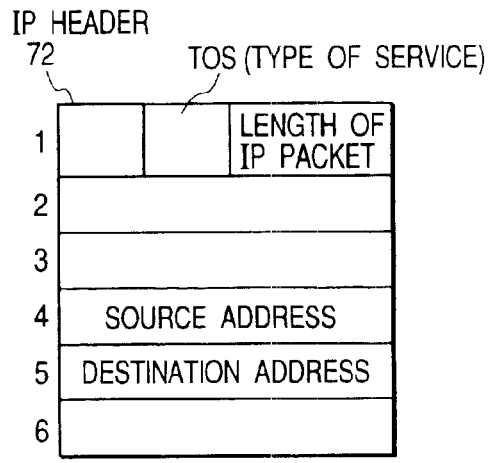
FIGS. 4A and 4B are drawings respectively showing the formats of the IP header and cell header.

An IP header 72 as for instance shown in FIG. 4A has a header length of 6 octades (24 bytes), and contains information for TOS (type of service), IP packet length, source address and destination address, etc.

Figure 4B:
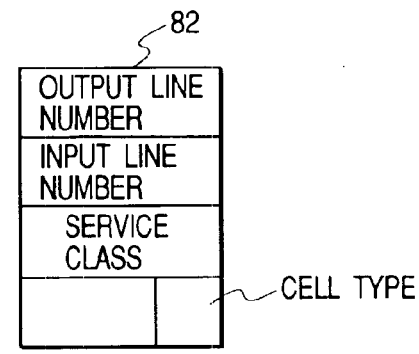

Further, the cell header 82 added to each data block 81 of this embodiment as for instance shown in FIG. 4B, contains an output line number, an input line number, a service class, and a cell type for indicating that the cell is which of a first cell, a final cell and any other cells within the original packet or message. In assembling the cells for the IP packet, a method (AAL5, etc.) standardized such as for ITU-T or ATM Forum may be applicable.

The input line interface 1—1 shown in FIG. 2 operates to store the IP packets received from the input line IN-1 into the buffer memory 12, and access the routing table 13 with the use of the destination address or a combination value of source address and destination address contained in the header 72 of the IP packet as a search key, thereby to read out the cell header information which is previously stored in the table 13 in correspondence to the search key by the routing management unit 5.

Among the control information constituting a cell header 82, the input line number is a particular value for each input line interface. The service class is specified with the TOS field of the IP header when the IP header is read out from the buffer memory. The cell type for identifying the first cell, final cell and other cells is determined by the cell assembler 14 based on the packet length contained in the IP header. Therefore, the minimum requirement for the control information that must be supplied from the routing table 13 is the output line number.

The cell assembler 14 reads out the first data block of the packet containing the IP header from the buffer memory 12 upon receiving the output line number from the routing table 13, and generates the cell header 82 as shown in FIG. 4B. The cell assembler 14 then forms the first cell containing the first data block at a payload section. Based on the packet length extracted from the IP header, the cell assembler 14 also reads out the remaining data blocks following the first data block one after another while monitoring the remaining packet size. For the final data block, inadequate data lengths is adjusted to a fixed block length by pudding filler bytes. These data blocks are converted into internal ATM cells one after another by adding cell headers to each of them.

The ATM cell output from the cell assembler 14 is written into the input buffer memory 15 by means of the memory controller 16. This memory controller 16 forms a plurality of cell queues in the input buffer memory 15 according to the output line number and service class of the ATM cell header, and registers the cells in sequence into their corresponding cell queues.

In the example shown in FIG. 2, a plurality of logical buffer regions 150 (150-1 to 150-$m$) corresponding to output line number are formed in the buffer memory 15, and two cell queues Q1, Q2 are formed in each buffer region 150 by classifying the service priority into two classes, that is, a priority class and a non-priority class. The classification however may be made into three or more classes according to priority.

Further, if a shared buffer structure is applied to the buffer memory 15, the same buffer region is commonly used for a plurality of output lines and available space of the memory is shared by respective cell queues. Therefore, it is able to form a necessary number of cell queues in a reduced capacity of memory area.

Besides writing into the buffer memory 15 of cells delivered from the cell assembler 14, the memory controller 16 reads out non-transmitted cells one after another during the read cycle assigned by scanning the input ports LI-1 to LI-n periodically. Cell readout is performed from the cell queues Q1 if the priority class of cells are remaining, and when all the priority class of cell queues Q1 become empty, non-priority class of cells are read out from cell queues Q2. The memory controller 16 also receives notification of congestion from the congestion notifier 4 through a signal line 19 and when any of the output lines OUT-i (or output ports LO-i) is alarmed as a congested line, the memory controller 16 inhibits the forwarding of cells to the alarmed output line in response to the contents of the congestion notification.

The notice of congestion may be formed in a bitmap format in which plural sets of indication bits are assigned to each output line. For instance, two bits corresponding to the priority classes are assigned to the respective output lines, with the first bit indicating if forwarding of the priority cell is allowed or not, and the second bit indicating if forwarding of the non-priority cell is allowed or not. In the notice of congestion shown in FIG. 2, since the indication bits "10" corresponding to the output line [1], (OUT-1) indicate a light congestion status on the output line [1], each of the input line interfaces stops cell readout from the non-priority cell queue Q2 corresponding to the output line OUT-1. Further, indication bits "11" corresponding to the output line [N] (OUT-n) indicate that the output line [N] is a serious congestion so that the inflow of cells is prohibited for both priority and non-priority cells. Accordingly, up until the time that the status of the indication bits is changed over, each of the input line interfaces, which is transmitting cells to the output line [N], stops readout of cells not only from the non-priority queue Q2 but also from the priority queue Q1. If the priority categories are three classes or more, the number of indication bits may be increased in order to correspond to the number of classes.

Figure 5:
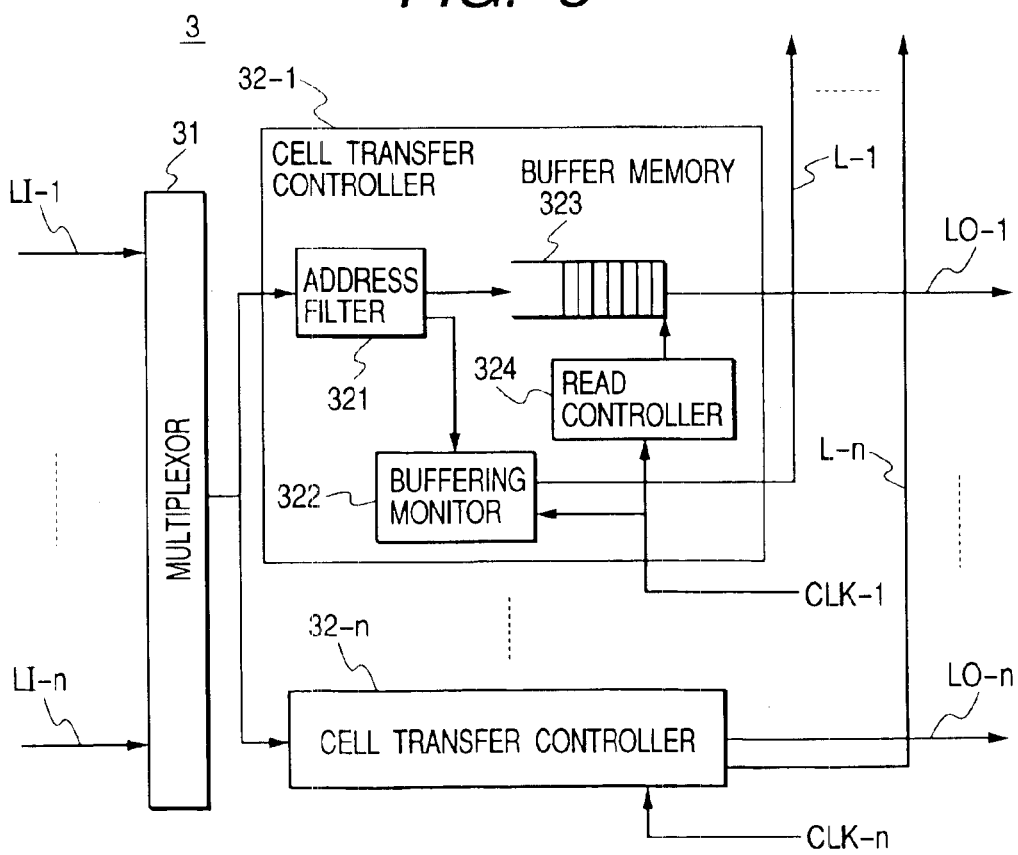
FIG. 5 is a block diagram of the configuration of the switching unit 3 in FIG. 1.

FIG. 5 shows an example of the configuration of the switching unit 3 in FIG. 1.

The switching unit 3 comprises a mulitplexor 31 for multiplexing the cells received in parallel from the input ports LI-1 to LI-n to deliver the input cells in time sequential, and a plurality of cell transfer controllers 32 (32-1 to 32-$n$) installed to correspond to the respective output ports LO-1 to LO-n.

The cell transfer controller 32-1 comprises an address filter 321 for filtering the cells output from the multiplexor 31 to selectively fetch only the cells containing a specified output line number corresponding to the output line LO-1 in the cell header, a buffer memory 323 for queuing of the cells, a buffering monitor 322 for monitoring the number of stored cells in the buffer memory 323, and a read controller 324 for reading out the stored cells from the buffer memory 323 at a readout timing indicated by the readout clock CLK-1. Other cell transfer controllers 32-2 to 32-$n$ are also comprised of the same structure.

In the above switch structure, the priority cells and non-priority cells destined for the same output port are stored in a mixed state in one cell queue formed in the buffer memory 323. These stored cells are read out in FIFO fashion in their arrival sequence.

Further, the buffering monitor 322 monitors the number of cells stored in the buffer memory 322 while incrementing (adding 1) the number of stored cells in response to the cell write notification from the address filter 321 and decrementing (subtracting 1) the number of stored cells in response to the cell readout clock CLK-1. At the point when the number of cells in the buffer memory 323 has reached a first predetermined threshold value, the buffering monitor 322 generates a congestion signal indicating light congestion status to the signal line L-1 connected to the congestion notifier 4, and at the point when the number of stored cells has reached a second predetermined threshold value which is larger than the first threshold value, a congestion signal indicating serious congestion is issued. The second threshold value is a value which is lower than the storage capacity of the buffer memory 323 and able to leave enough of a margin to store additional cells coming into the cell transfer controller within the period (control delay time) until forwarding of cells is stopped by the input line interface 1 in response to the notice of congestion issued from the congestion notifier 4.

Figure 6:
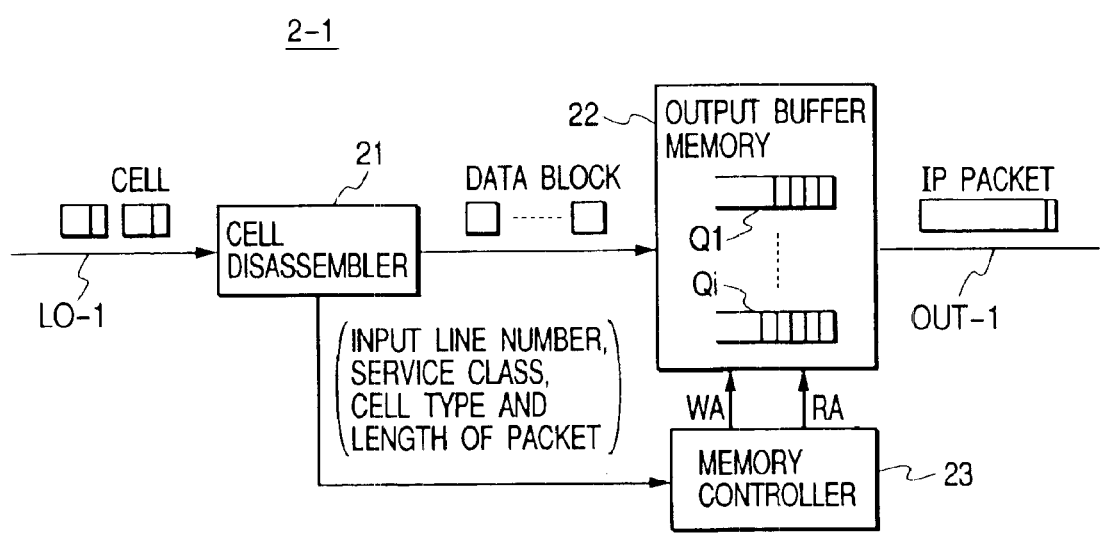
FIG. 6 is a block diagram showing the configuration of the output line interface 2-1 in FIG. 1.

FIG. 6 shows an example of the configuration of the embodiment of the output line interface 2-1 in FIG. 1. The output line interface 2-1 comprises a cell disassembler 21 for removing the cell header 82 from the cells received from the output port LO-1 of the switching unit 3, an output buffer memory 22 for storing the data blocks 81 supplied from the disassembler 21 into queues corresponding to their original IP packets, respectively, and a memory controller 23 for controlling the writing of the data blocks into the output buffer memory 22 and the reading out of the restored IP packets from the buffer memory.

The memory controller 23 receives the packet length extracted from the IP header contained in the first cell of each IP packet, the service class, cell type and the input line number which are extracted from the cell header from the cell disassembler 21. The memory controller 23 then stores the data block in the corresponding queues formed for each input line number and for each class. Since the restoration of one IP packet is completed in the queue when a data block of the final cell has been registered in the queue, the IP packet is then read out from the queue to sent out to the output line OUT-1. Further, since high priority cells can arrive first to the output line interface 2-1 due to the cell forwarding control carried out according to the order of priority by the input line interfaces 1—1 to 1-$n$, the restoration of the IP packets is in effect, completed in the order of priority class. As a result, IP packets are sent out to the output line OUT-l in the order of priority.

Figure 7:
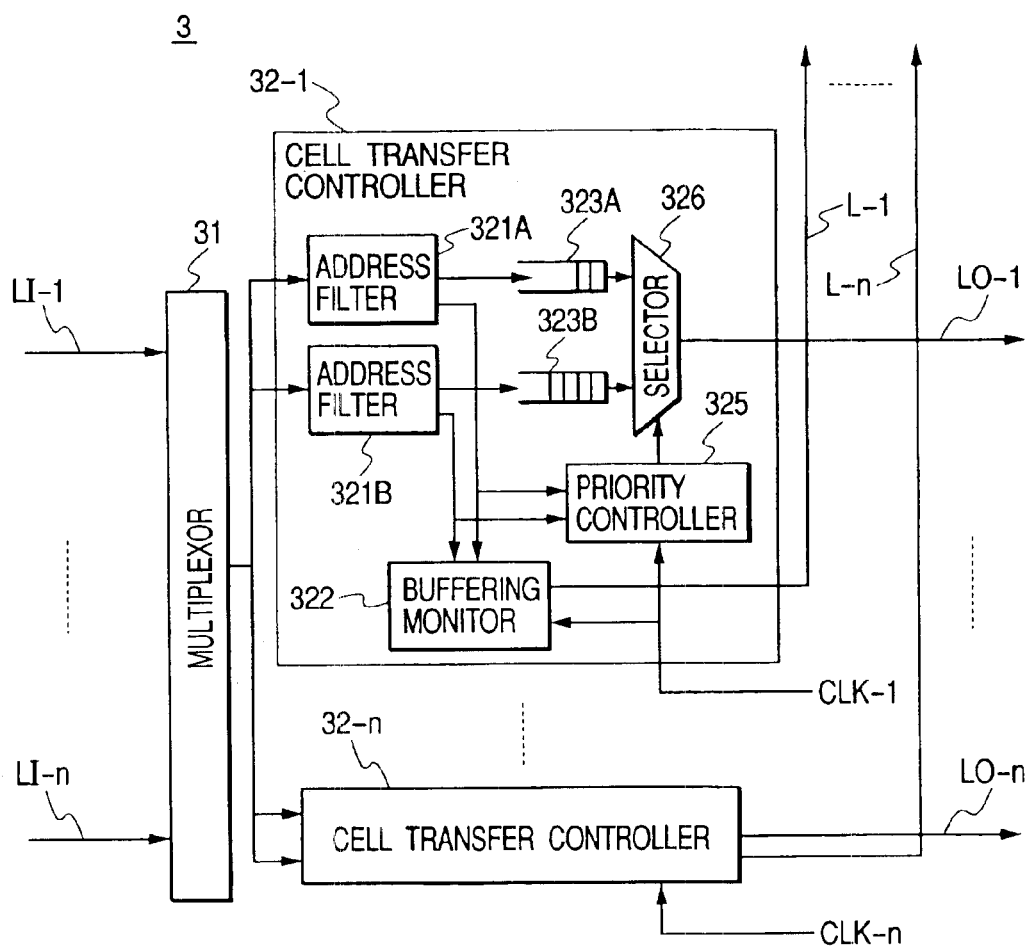
FIG. 7 is a block diagram showing another configuration of the switching unit 3 in FIG. 1.

FIG. 7 shows another embodiment of the switching unit 3 applicable to the packet switch shown in FIG. 1.

The switching unit 3 of this embodiment similar to that shown previously in FIG. 5 comprises the multiplexor 31 and the plurality of cell transfer controllers 32-1 to 32-$n$ installed for each output port LO-1 through LO-n. Comparing to FIG. 5, the switching unit of this embodiment is characterized in that each cell transfer controller 32 is provided with two address filters 321A, 321B for filtering the input cells by respective service classes according to the order of priority of the cell, two cell queues (priority cell queue 323A and non-priority queue 323B) for queuing the cells by respective classes, a selector 326 for reading out of cells from selected one of the two queues, and a priority controller 325 for generating a selection signal to be given to the selector in order to select one of said queues.

In FIG. 7, the cell headers of the input cells delivered from the multiplexor 31 are analyzed by the address filters 321A, 321B in each of the cell transfer controllers 32. Each of said address filters operates to selectively fetch a group of cells, each of which contains in the cell header an output line number particular to the transfer controller and a priority class particular to the address filter, and stores these fetched cells in a queue 323A or 323B according to the priority classes.

The priority controller 325 monitors the cell input signals for each class supplied to the buffering monitor 322 from the address filters 321A, 321B and performs readout of cells according to the order of priority. In other words, during each readout cycle indicated by the clock CLK-1, the priority controller 325 determines whether stored cells are present or not in the priority cell queue 323A and the non-priority cell queue 323B and if cells are present in the priority cell queue 323A, performs readout of cells from the priority cell queue and if no cell is stored in the priority cell queue, then performs readout of cells from the non-priority cell queue by selectively applying control signals to the selector 326 to select the queue.

This selective control of the readout of cells by means of the priority controller 325 allows the forwarding of priority cells first to the output port LO-1, even if these priority cells arrive originally behind a non-priority cell so that a remarkable reduction in forwarding delays can be achieved within the packet switch. Further, in the case of this embodiment, the buffering monitor 322 receives the cell input signals of the respective classes from the address filters 321A, 321B and counts the quantity of cells stored in the buffer memory according to the respective class. Accordingly, by monitoring whether the numbers of stored cells in the priority cell queue 323A and the non-priority cell queue 323B have exceeded the predetermined threshold values assigned thereto, respectively, notice of congestion (congestion control signal) for each priority can be issued.

When forming the cell queues 323A and 323B in a form of logical queues within a shared buffer, a first threshold value for indicating light congestion and a second threshold value indicating serious congestion may be established by taking into account the overall capacity of the buffer memory. A first congestion control signal, for instance, can be issued when the total number of cells stored in the cell queues 323A and 323B has exceeded the first threshold value, thereby to prohibit the inflow of non-priority cells, and when the total number of stored cells has exceeded the second threshold value, a second congestion control signal is issued in order to prohibit the inflow of priority cells. This congestion control process may be altered so that the inflow of cells into the non-priority cell queue 323B is prohibited at the point where the total number of stored cells has exceeded the first threshold value, and the inflow of cells into the priority cell queue 323A is prohibited at the point where the number of cells stored in the queue 323A has exceeded a value obtained by subtracting the first threshold value from the second threshold value.

Figure 8:
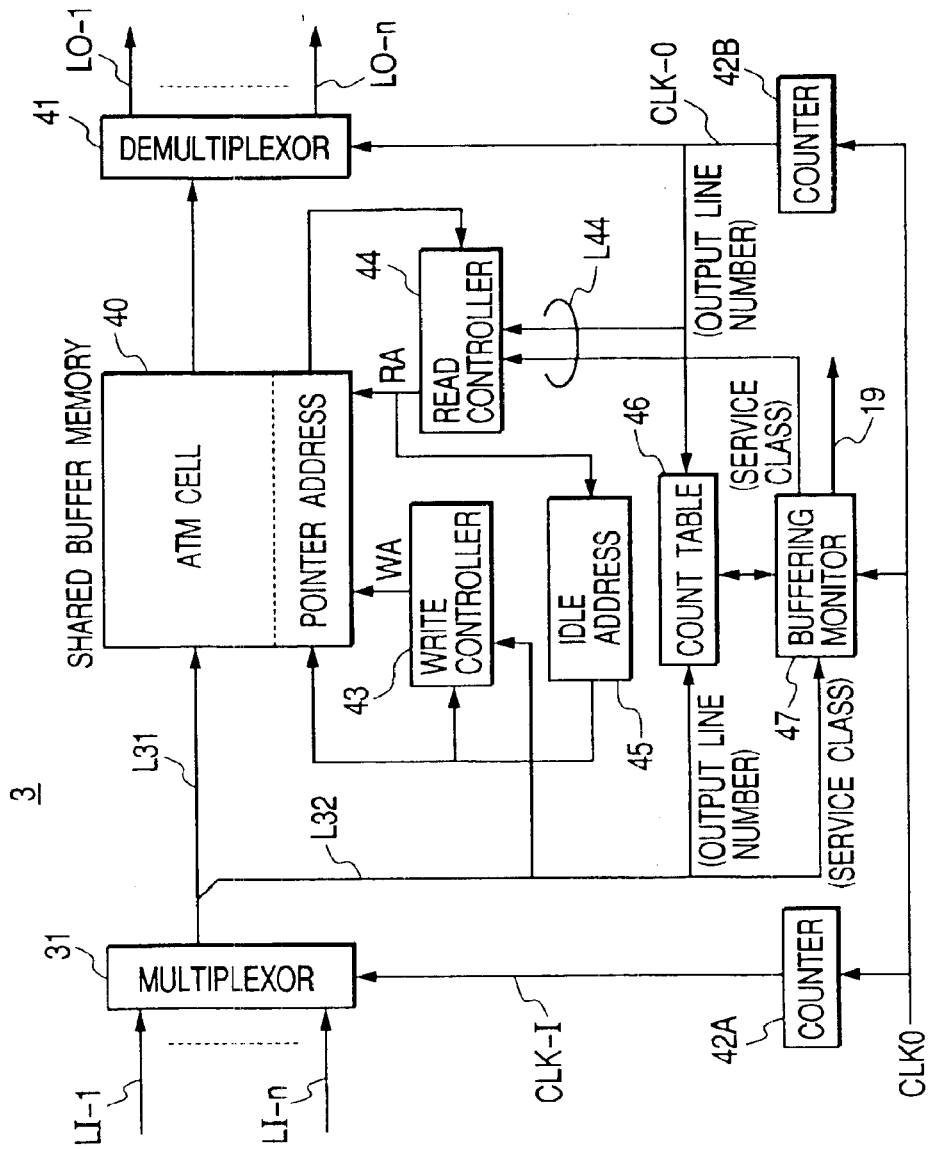
FIG. 8 is a block diagram showing still another configuration of the switching unit 3 in FIG. 1.

FIG. 8 shows still another embodiment of the switching unit 3 applicable to the packet switch shown in FIG. 1.

During the write cycle, the ATM cells supplied in parallel from the input ports LI-l through LI-n are delivered time sequentially to the signal line (bus) L31 through the multiplexor circuit 31 and written into the shared buffer memory 40 by means of the write controller 43. This write controller 43 is provided with a write address table for storing the write addresses for each output line and for each service class. Every time the input cell is delivered from the multiplexor 31, the write controller 43 receives the output line number and the service class contained in the header section of the input cell via the signal line L32. This information is used as an address for accessing the write address table to read out a write address WA. Each of the input cells delivered to the signal line L31 is written into the cell region of the shared buffer memory 40 at a memory location specified by the write address WA. At this time, a next address obtained from an idle address buffer 45 is written into write address table instead of the previous write address WA. The next address is also written into the pointer address region of the shared buffer memory 40 as a pointer address of a next cell.

In the shared buffer memory 40, the next address (pointer address) written in the pointer address region is paired with the cell stored in the cell region. When a new cell having the identical output line number and identical service class with the stored cell is received later, by writing the new cell by using the next address read out from the write address table which is identical to the previously stored pointer address, a plurality of logical cell queues, each of which links a plurality of cells by the pointer addresses, can be formed in the shared buffer memory classifying by service class for each output line. The stored cells in the shared buffer memory 40 are read out by the read controller 44 and distributed to the corresponding output ports LO-1 to LO-n through a demultiplexor 41.

The read controller 44 is provided with a read address table for storing read addresses for each output line and for each service class. In the read cycle alternately assigned with the write cycle, the read address table is accessed based on the output line number and service class supplied from the signal line L44 as an address, whereby read out a read address RA. By using this read address RA, a pair of an internal cell and a pointer address are read out from the pointer address region and the cell region of the shared buffer memory 40. Then the read address RA no longer needed is released and registered as an idle address in the idle address buffer 45. The pointer address read out from the pointer address region is stored in the read address table as the next read address instead of the previous read address RA.

In FIG. 8, CLK0 is a clock signal for regulating the read/write cycle. The reference number 42A denotes a counter to make a count at the leading edge of the clock CLK0 pulse and supply the select clock signal CLK-I for selecting one of the input ports LI-1 to LI-n to the multiplexor 31. The reference number 42B denotes a counter to make a count at the falling edge of the clock CLK0 pulse and supply a clock signal CLK-O for selecting one of the output ports LO-1 to LO-n in the demultiplexor 41. The output line number to be supplied to the read address table is obtained from the output CLK-O of the counter 42B.

The reference numeral 46 denotes a count table memory for storing the number of stored cells for each service class corresponding to the output line number. The reference numeral 47 denotes a buffering monitor coupled with the count table memory 46. During the write cycle, the count table memory 46 is addressed with the output line number of each input cell appearing on the signal line L32. During the read cycle, the count table memory 46 is addressed with the output line number supplied from the counter 42B so as to output a counter record corresponding to the output line number to the buffering monitor 47. This counter record comprises a plurality of count areas prepared for each service class, for example, priority class and non-priority class. The buffering monitor 47 increments (adds 1) the count value of stored cells in a count area corresponding to the service class of each input cell supplied from the signal line L32 during the write cycle and then issues a congestion control signal according to the results of comparing the stored cell count with a predetermined threshold 5 value. Also, during the read cycle, the buffering monitor 47 checks the counter record readout from the memory 46 in correspondence with output line number and determines the service class to be applied to the read controller 44 via the signal line L44. Namely, readout of a cell queue from a priority class is designated as far as the count value of the count area for the priority class is not a zero, otherwise readout from the cell queue for a non-priority class is designated.

In the case of the above embodiment, since the status of the cell queues for all output lines is monitored by the buffering monitor 47, it is able to omit the congestion notifier 4 shown in FIG. 1 and to directly supply the control information indicating congestion status of all output lines to each input line interface 1 from the buffering monitor 47.

Figure 9:
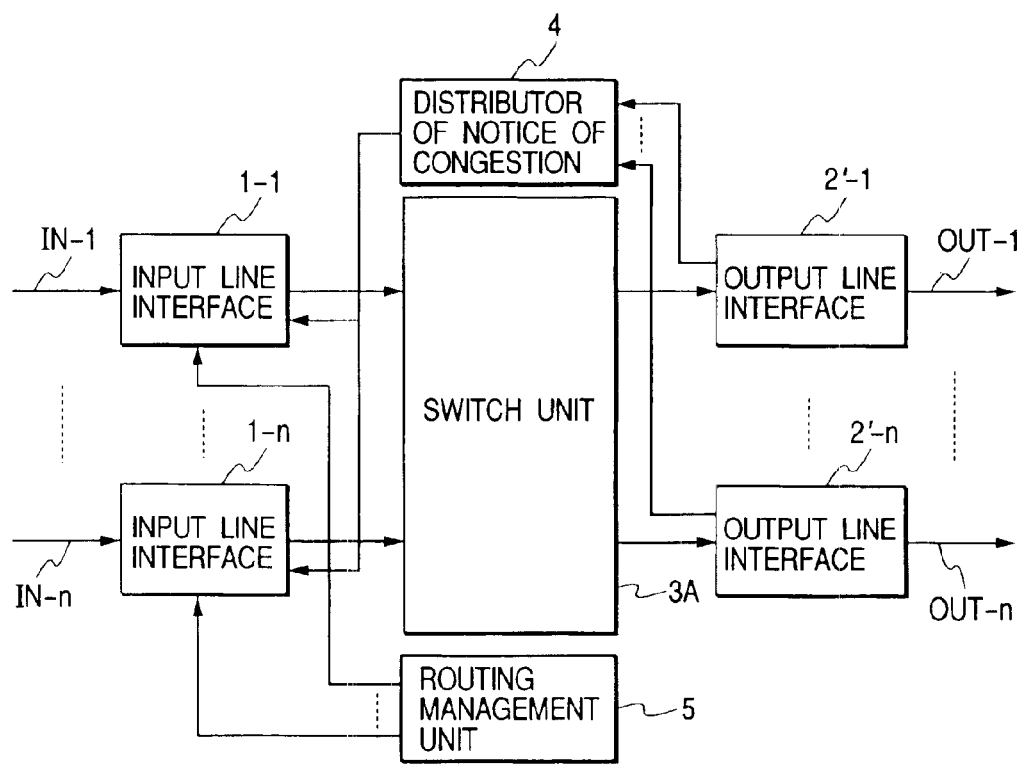
FIG. 9 is a block diagram showing a second embodiment of the packet switch of this invention.

FIG. 9 shows the second embodiment of the packet switch of this invention.

This embodiment employs a packet switch having no buffer memory to form cell queues as the switch unit 3A, and the congestion status is detected at each output line interface 2'(2'-1 to 2'-n) and informed to each input line interface 1 (1—1 to 1-n) via the congestion notifier 4. The same configuration as shown for the first embodiment in FIG. 2 can be adopted for each input line interface 1.

Figure 10:
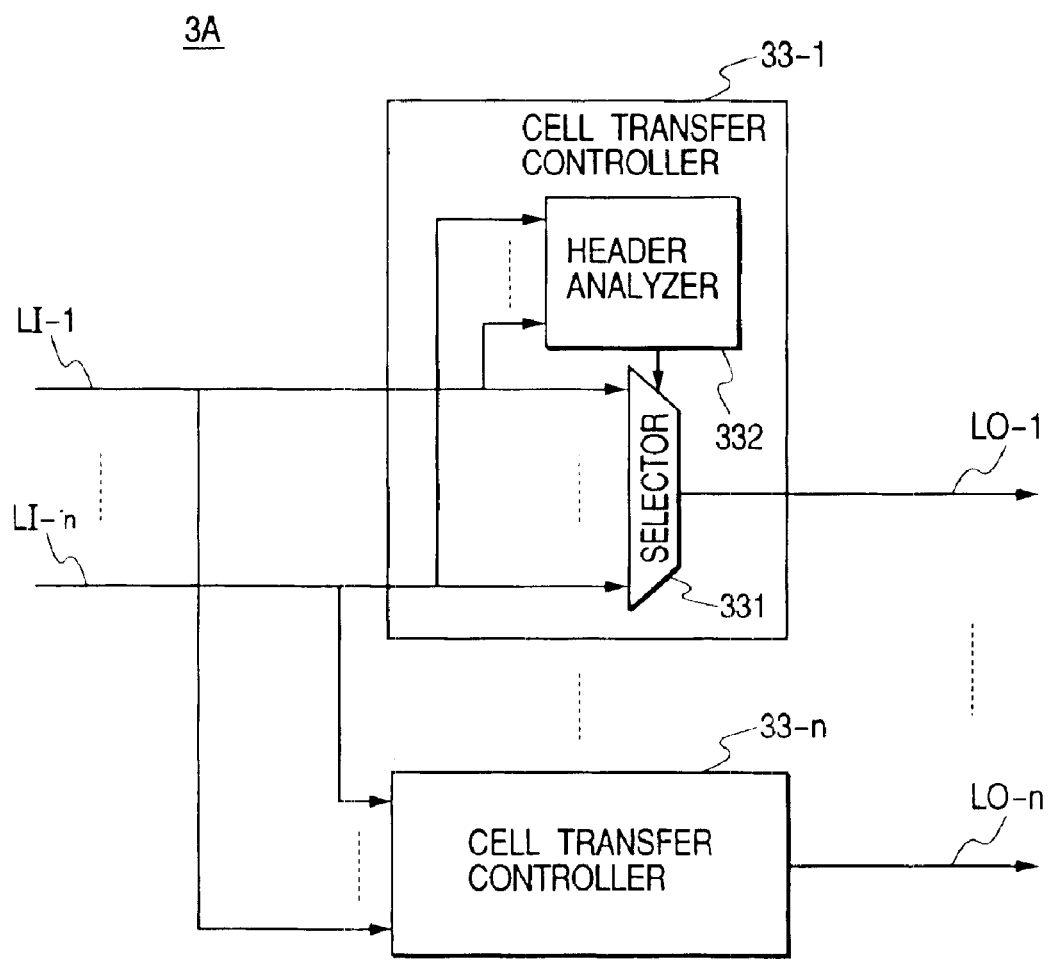
FIG. 10 is a block diagram showing a configuration of the switching unit 3A in FIG. 9.

FIG. 10 shows an example of the configuration of the switching unit 3A in FIG. 9.

The switching unit 3A is of a crosspoint type comprising of a plurality of cell transfer controllers 33 (33-1 through 33-n) installed for each of the output ports LO-1 through LO-n. Each cell transfer controller 33 comprises a selector 331 connected to a plurality of input ports LI-1 through LI-n for selecting one of the input ports to pass an input cell from the selected input port to the output port, and a header analyzer 332 for analyzing the cell header of the input cells supplied from the input ports and controlling the selector 331 to selectively allow such a cell that has a predetermined output line number corresponding to the output port to pass through the selector.

Figure 11:
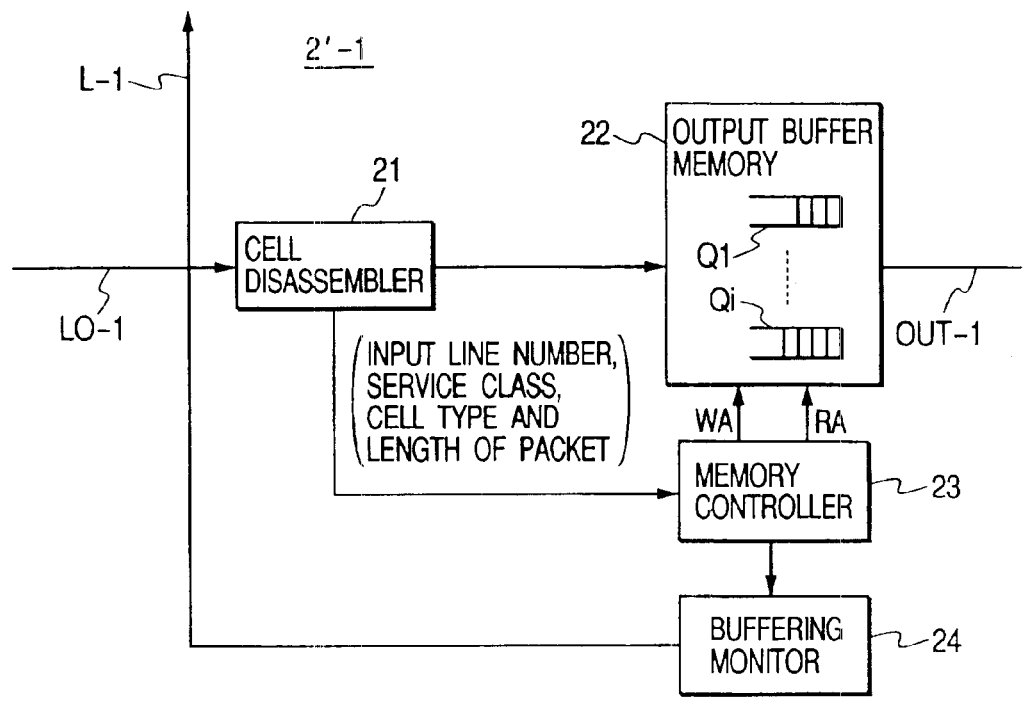
FIG. 11 is a block diagram showing the configuration of the output interface line 2'-1 in FIG. 9.

FIG. 11 shows an example of the configuration of the output interface line 2'-1 in FIG. 9.

The output interface line 2'-1, besides the cell disassembler 21, the output buffer memory 22 and memory controller 23 identical to that of the input line interface 2-1 shown in FIG. 6, has a buffering monitor 24 (congestion monitoring section) connected to the memory controller 23 for monitoring the congestion status of the output buffer memory 22.

The buffering monitor 24 obtains, when the memory controller 23 writes a cell into the buffer memory 22 and reads out an IP packet from the buffer memory, information for identifying the cell queue (for instance input line number and service class) and R/W category from the memory controller. The buffering monitor 24 then calculates the quantity of the stored data block for each service category in the output buffer memory 22 based on the above information, and generates a congestion control signal to limit the inflow of cells according to the total quantity or individual quantity by service class of the stored data blocks and informs the congestion notifier 4 of the congestion control signal via the signal line L-1.

Instead of comparing with the threshold value by the respective buffer monitors 24 associated with the output lines, the congestion notifier 4 may make an inquiry to each buffering monitor 24 about the quantity of stored data blocks for each class, so that the congestion notifier 4 compares these quantities in a batch with the threshold values, generates congestion control information for each class and for each output line and notifies to each input line interface of this control information.

In this embodiment, a notification of light congestion status may be issued to prohibit the in-flow of non-priority cells, for example, when the total quantity of data blocks stored in the output buffer memory 22 has reached a first threshold value, or when the quantity of stored data blocks of non-priority cells has exceeded a predetermined threshold value. The inflow of priority cells may be also prohibited when the total quantity of stored data blocks has reached a second threshold value or when the total quantity of stored data blocks of priority cells has exceeded a predetermined threshold value.

In this case, since the readout of data block from the output buffer memory 22 is not carried out until the final cell of the IP packet has arrived, mere restriction of the inflow of all priority cells under the serious congestion will not necessarily restore the situation back to a normal status. For this reason, the number of cell queues (data block queues) formed by the memory controller 23 in the buffer memory 22 may be restricted in order to prohibit the inflow of cells of the other packets when the number of cell queues reaches a predetermined upper limit. Further, by calculating the number of cells expected to arrive previous to the final cell based on the packet length and number of cells already received in each queue, the buffer monitor 24 may issue the status notification so as to allow the inflow of a specified priority packet, for which the smallest number of cells are awaited for to complete the assembling of the IP packet, while prohibiting forwarding of cells belonging to the other packets during the times of serious congestion. In this case, the congestion status notification may include, besides a light/serious congestion indication bits, information bits for specifying the cells which are admitted (or prohibited). The additional information bits may includes packet identification comprising, for example, input line numbers and service class of a packet.

The third embodiment of the packet switch of this invention is explained next.

Figure 12:
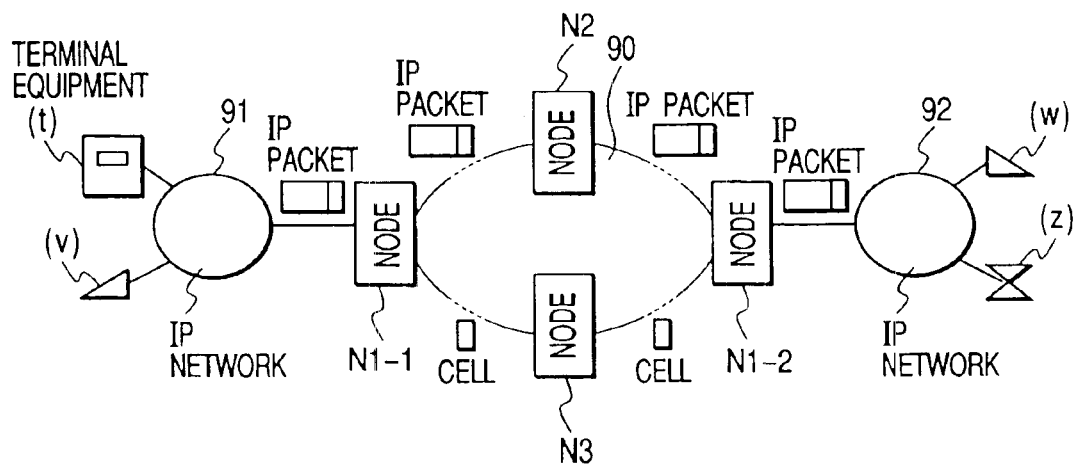
FIG. 12 is a drawing showing one example of a communication network adaptable for use with the packet switch of this invention.

FIG. 12 shows a communication network adaptable for use with the packet switch N1 (N1-1, N1-2) of this embodiment.

When for instance forwarding an IP packet generated from one of terminals (t) through (v) connected to an IP network 91 to another one of terminals (w) through (z) connected to an IP network 92 at the other end as shown in the FIG. 12, the IP packet is relayed through an intermediate network 90 comprising a plurality of nodes (packet switches) between the source IP network 91 and the destination IP network 92. In the intermediate network 90, if the aforementioned packet switch of this invention is applied a path including the nodes N1-1, N2, N1-2 for performing IP packet communication, transmission delays may become a problem because of the repetitive conversion of IP packets to ATM cells and vice versa at each node. However, if communication is performed between nodes with ATM cells such as in the path including the nodes N1-1, N3, N1-2, the above mentioned conversion between IP packets to ATM cells becomes unnecessary and transmission delays can be remarkably improved.

This invention also provides a node apparatus that can accommodate both ATM cell lines and IP packet lines as shown in nodes N1 (N1-1, N1-2) in order to selectively connect to either packet switches or ATM switches.

Figure 13:
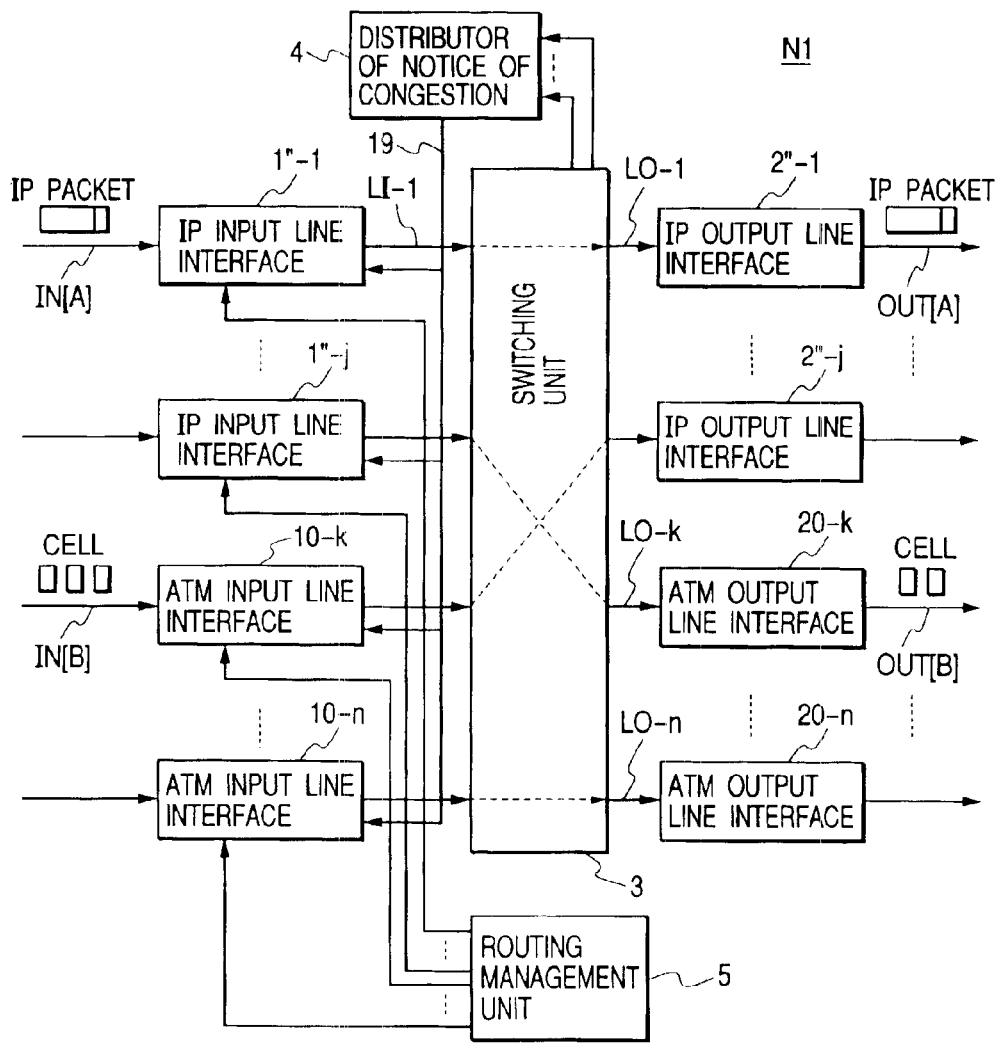
FIG. 13 is a block diagram of a third embodiment of the packet switch of this invention.

FIG. 13 shows the third embodiment of the packet switch of this invention adaptable for use as the above mentioned node apparatus N1.

This packet switch comprises a plurality of IP input line interfaces 1" (1"-1 through 1"-j) connected to input lines IN[A] for the IP packet, a plurality of ATM input line interfaces 10 (10-k through 10-n) connected to input lines IN[B] for the ATM cell, a switch unit 3 for performing switching operation in the cell units, a plurality of IP output line interfaces 2" (2"-1 through 2"-j) connected to IP packet output lines OUT [A], a plurality of ATM output line interfaces 20 (20-k through 20-n) connected to ATM cell output lines OUT [B], a congestion notifier 4 for informing each of the input line interfaces of the congestion status in the switch unit 3, and a routing management unit 5 for controlling routing information for the IP packets and connection information for the ATM cells.

Here, it is assumed that the switching unit 3 is provided with a buffering monitor function and congestion status information is supplied to the congestion notifier 4 as same as the first embodiment. The switching unit 3 may adopt any one of the configurations described in FIG. 5, FIG. 7 and FIG. 8, and the congestion notifier 4 can be omitted if the configuration of FIG. 8 is employed.

Figure 14A:
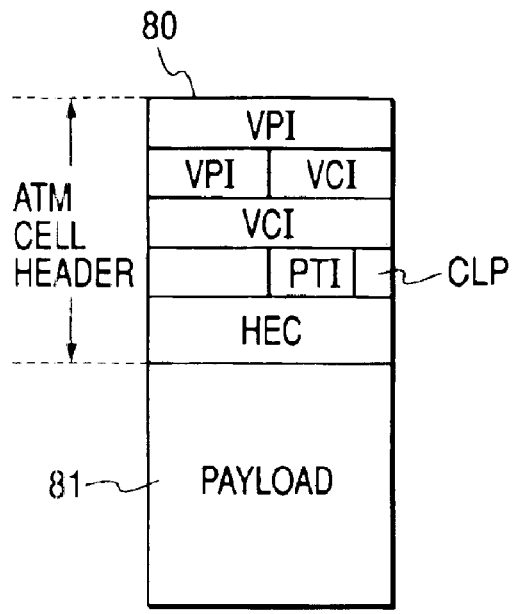
FIGS. 14A and 14B are drawings respectively showing the formats of the internal cell and the input ATM cell suitable for use with the third embodiment of this invention.
Figure 14B:
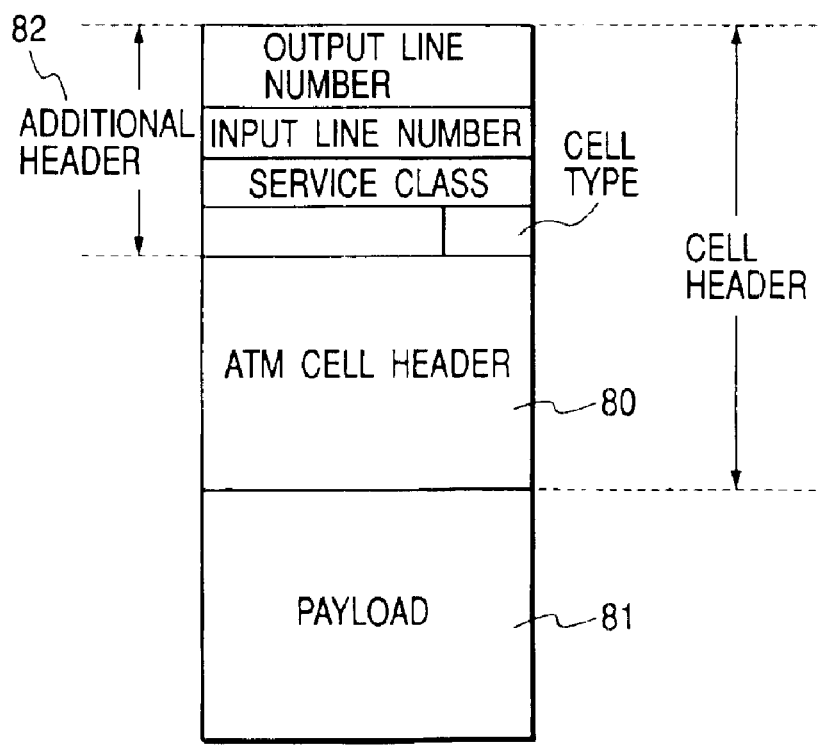

FIG. 14a shows the format of the ATM cells input from and output to the ATM lines IN[B] and OUT[B]. FIG. 14b shows the format of the internal cell processed within the switch unit 3.

The header format of the cells transmitted along the ATM line, differs somewhat depending on whether the connection interface is NNI (Network-Network Interface) or UNI (User-Network Interface). In the case explained here, each ATM cell has a five byte cell header 80 as stipulated for NNI.

The ATM cells on the ATM input line IN [B] and ATM output line OUT [B] comprises a five byte cell header 80 and a 48 byte payload 81 as shown in FIG. 14a. The ATM cell header 80 contains a 12 bit VPI (Virtual Path Identifier), a 16 bit VCI (Virtual Channel Identifier), a 3 bit PTI (Payload Type Identifier), a 1 bit CLP (Cell Loss Priority) and an 8 bit HEC (Header Error Check).

In contrast, the internal cell used within the packet switch of this embodiment is provided with an additional header 82 containing an output line number, an input line number, service class, and cell type ahead of the ATM cell header 80 as shown in FIG. 14B.

Figure 15:
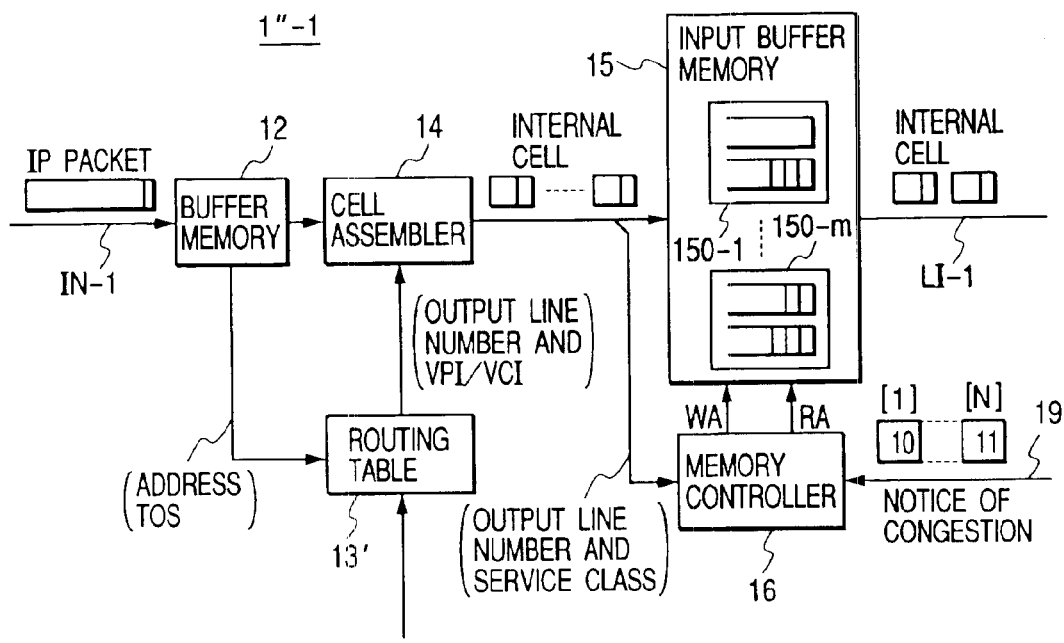
FIG. 15 is a block diagram of the configuration of the input line interface 1"-1 of FIG. 13.

FIG. 15 shows an example of the configuration of the input line interface 1"-1.

The IP input line interface 1"-1 comprises the same circuit elements as the line interface 1—1 shown in FIG. 2. However, the routing table 13' is accessed by using the IP address and TOS extracted from the IP packet header as a search key, thereby to read out an output line number and VPI/VCI previously stored corresponding to the keys. The cell assembler 14 segments the IP packet read out from the buffer memory 12 into a plurality of fixed length (for example, 48 byte) data blocks. Each of these data blocks forms the payload 81 to which an ATM cell header 80 and internal header 82 are added to form the internal cell as shown in FIG. 14B and sequentially supplied to the buffer memory 15.

For the header information, an identification code for indicating a user cell is set in the PTI field of the ATM cell header 80, a particular number assigned beforehand to each interface is set in the input line number within the internal cell header 82, and a value determined based on the TOS extracted from the IP header is set in the service class. As the cell type, a category code obtained by a sequence check on a series of data blocks delineated by the IP packet length is set.

Figure 16:
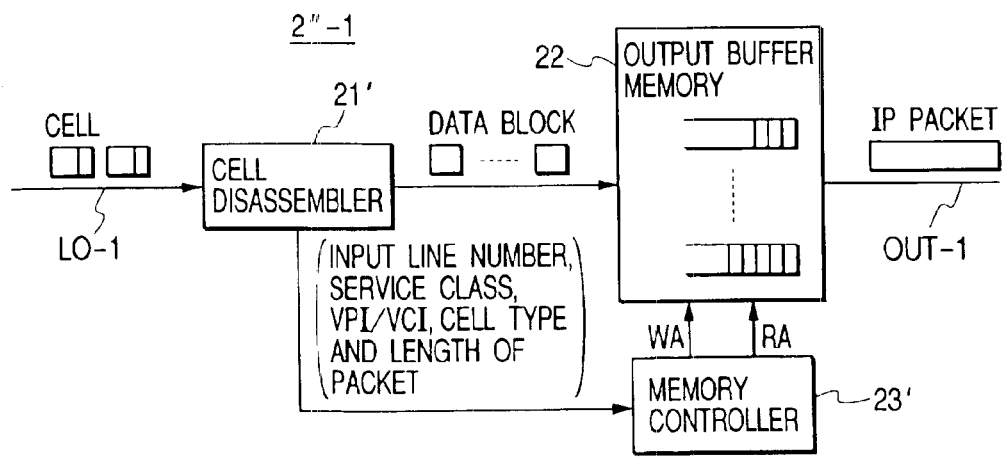
FIG. 16 is a block diagram of the configuration of the output line interface 2"-1 of FIG. 13.

FIG. 16 shows an example of the configuration of the output line interface 2"-1.

The IP output line interface 2"-1 comprises the same circuit elements as the output line interface 2 of the first embodiment described in FIG. 6. In the cell disassembler 21', the internal header 82 and the ATM cell header 80 are removed from each cell received from the output port LO-1, and the data blocks extracted from the payload section are written into the output buffer memory 22 under the control of the memory controller 23'.

In the case of this embodiment, ATM cells received from the ATM input line IN [B] and forwarded to the IP output line interface must be handled distinctively depending on the values of VPI/VCI even if they have the same service class. Therefore, besides the input line number and service class, VPI/VCI values are supplied to the memory controller 23' from the cell disassembler 21', and a plurality of queues are formed in the buffer memory 22 so that respective data blocks are stored classified by input line number, service class and VPI/VCI. Further, the memory controller 23' determines the arrival of the final cell data block based on the packet length and cell type supplied from the cell disassembler 21', and starts the reading out of one packet length of data blocks from a queue in which the data block of the final cell has been registered these data blocks are then forwarded as an IP packet to the output line OUT-1.

Figure 17:
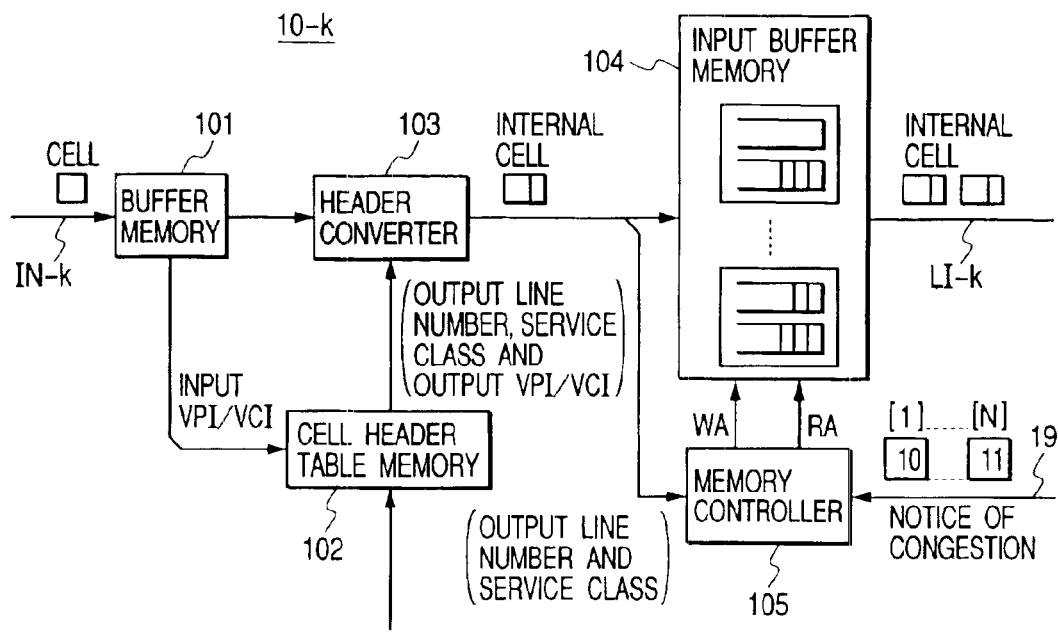
FIG. 17 is a block diagram of the configuration of the input line interface 10-k of FIG. 13.

FIG. 17 shows an example of the configuration of the ATM input line interface 10-$k$.

The ATM input line interface 10-$k$ comprises a buffer memory 101 for temporarily storing the cells received from the ATM input line IN-k, a cell header table memory 102 for storing the output VPI/VCIs and internal header information to be added to the output cells in correspondence with the input VPI/VCIs, a cell header converter 103 for converting the VPI/VCI of the input cell and generating an internal cell header 82 to output an internal cell based on the header information read out from the cell header table 102, an input buffer memory 104 for queuing the header-converted internal cells classifying by output line number and service class, and a memory controller 105 for controlling the read/write operations of cells in the input buffer memory.

The cell header table 102 is accessed based on the input VPI/VCI extracted from the header of each input ATM cell stored in the buffer memory 101 as a key in order to read out header information (output line number, service class, output VPI/VCI) previously stored in correspondence with the input VIP/VCI to the header converter 103. The header converter 103 converts the VPI/VCI of the input ATM cell read out from the buffer memory to the output VPI/VCI, and generates an internal cell header 82 based on the header information supplied from the table memory 102 and a particular input line number previously assigned to each interface, thereby to convert the input cells to the internal cells as shown in FIG. 14B and output the internal cells.

The memory controller 105 writes the internal cells into one of the cell queues according to the output line number and service class contained in the header of the internal cells and then reads out the internal cells from the cell queues while giving priority to the cells having a higher degree of priority. The readout control of internal cells from the cell queues and the restriction control of cell readout in response to the notice of congestion are performed by the memory controller 105 identically to that performed by the input line interface 1—1 of the first embodiment and the IP input line interface 1"-1.

Figure 18:
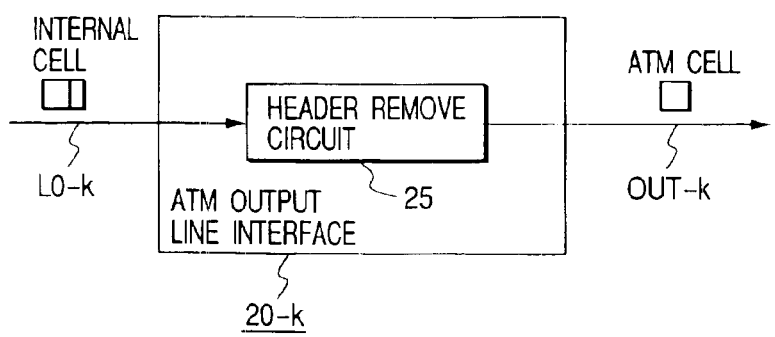
FIG. 18 is a block diagram of the configuration of the output line interface 20-k of FIG. 13.

FIG. 18 is an example of the configuration of the ATM output line interface 20-$k$.

In the internal cell appearing at the output port LO-k, the VPI/VCI value in the ATM cell header 80 has already been converted into an output VPI/VCI value by the input line interface. Accordingly, the ATM output line interface 20-$k$ merely removes the internal cell header (additional header) 82 from each internal cell received from the output port LO-k by the header remove circuit 25 and transmits the remainder of the cell to the ATM output line OUT-k.

According to the packet switch of the third embodiment, an IP packet received from one of input lines is switched in cell units to one of output ports connected to the ATM lines, and forwarded to the destination node in an ATM cell format. Therefore, by restoring the original IP packet at the destination node to forward along an IP network, the IP packet transmission delay time can be remarkably shortened. Although the switch unit 3 in FIG. 13 has a configuration for detecting the congestion status, the congestion status may be detected at each output line interface as same as the second embodiment.

Figure 19:
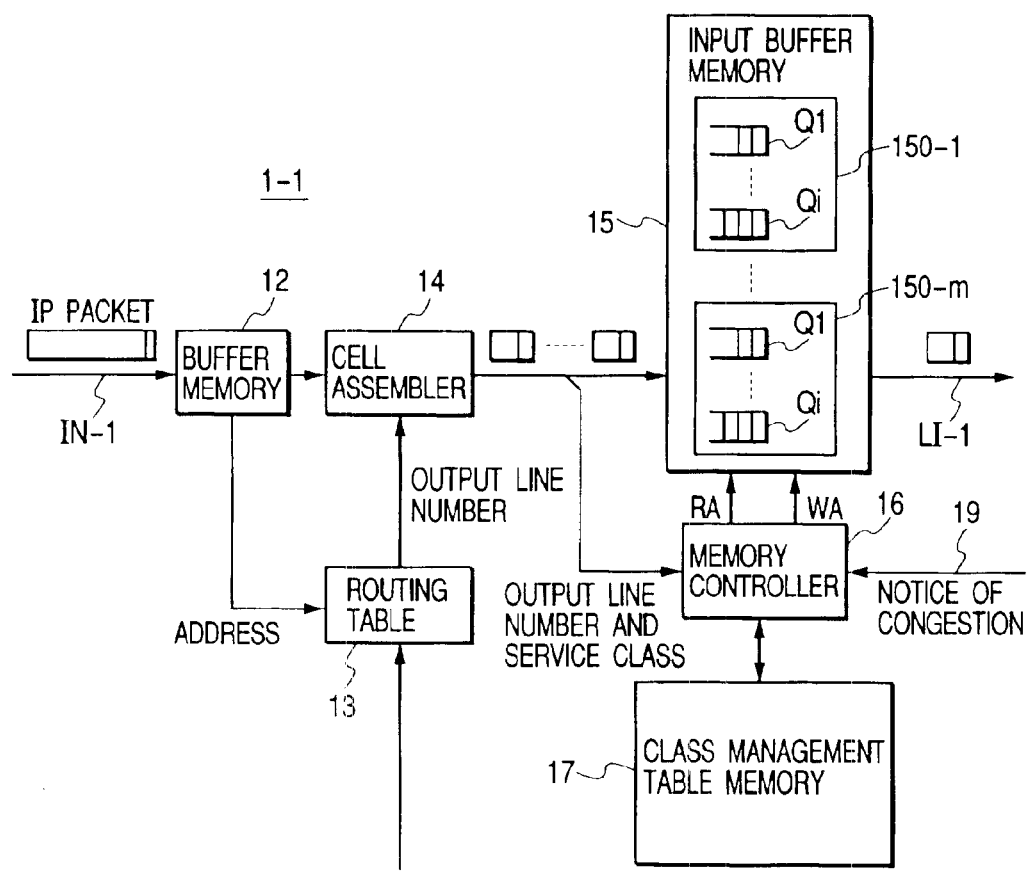
FIG. 19 is a block diagram showing another embodiment of the input line interface adapted for use with the packet switch of this invention.

FIG. 19 shows another embodiment of the input line interface which is suitable for controlling the cell transmission to the switch unit 3 by classifying the priority into three or more classes.

This embodiment is characterized by a class management table memory 17 which is referred to by the memory controller 16 installed in each of the input line interfaces of the first embodiment as described in FIG. 2. By referring to the class management control table 17, the memory controller 16 selectively reads out the stored cells from three or more classes of cell queues Q1 through Qi formed in the buffer memory 15 corresponding to the output lines.

In order to control forwarding of cells in three or more priority classes, a conversion table for defining the relation between the service type TOS contained in the IP header and the cell forwarding priority order is prepared for the cell assembler 14. The class identification information converted by the conversion table is added to the header of the respective cells to be output from the cell assembler.

In this case, the memory controller 16 writes the cells into one of cell queues specified by the output line number and the class identification information contained in the cell header of the respective cells, and reads out the cells from the cell queues in the order of high priority queues. By attaching the converted class information to each cell at the cell assembler 14, congestion control can be easily performed since the correspondence between the notice of congestion which is supplied to the memory controller through the signal line 19 from the switch unit or output line interfaces in the subsequent stage, and the cell queues whose transmission should be prohibited is judged directly.

As an alternate method, the cell header may include the TOS indicated by the IP header as class information, and the class management table memory 17 may include a conversion table for indicating the relation between TOS and service class. In this case, the memory controller 16 forms cell queues classified by TOS for each output line when writing the cells into the buffer memory 15 and reads out the cells from the cell queues in the order of highest class of TOS as defined in the above conversion table during the cell readout cycles.

Conversely, by referring the conversion table during the cell writing cycles, each cell may be registered into one of cell queues for each class as converted in the conversion table. In the latter case, the conversion table may be also referred to during cell readout cycles, in order to correlate the service class indicated by the notice of congestion, which is issued from the buffer monitor installed in the switch unit or output line interface, and the cell queues in the buffer memory 15. A table identical to the conversion table may also be installed in the congestion notifier 4 to perform conversion processing on the indication bits of the notice of congestion.

Figure 20:
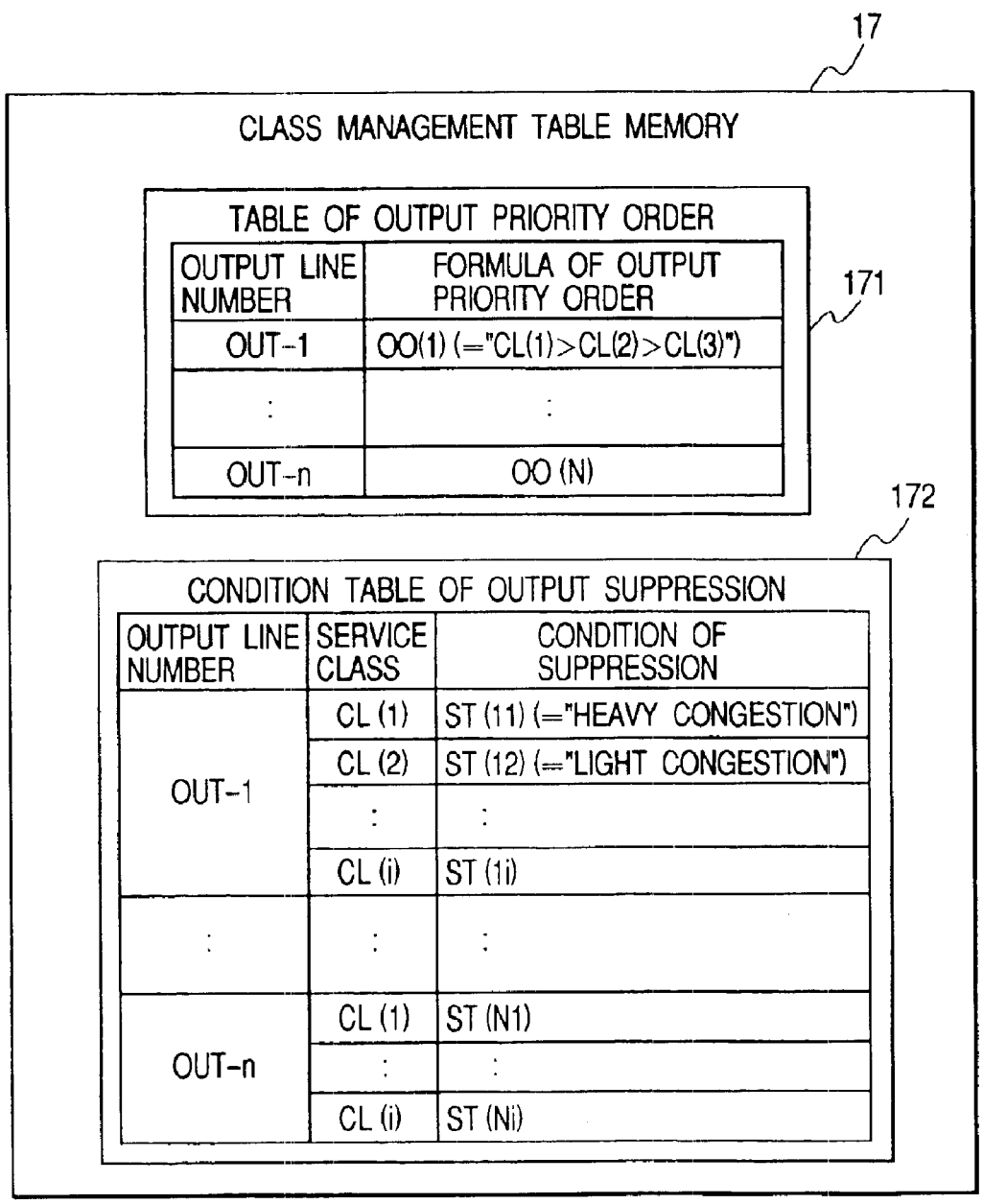
FIG. 20 is a drawing showing an example of the class management table memory suited for use with the input line interface of FIG. 19.

FIG. 20 shows an example of a class management table memory 17 capable of defining the conditions of output suppression and the order of output priority for each output line.

In this figure, the reference numeral 171 denotes a table of output priority order for indicating the order of output priority among service classes OO(1) through OO (N) for each output line OUT-1 through OUT-n, wherein variable definition formula is applied to each output line to define the order of priority sequence. The table of output priority order 171 may be set with a fixed formula to define the order of priority at the initial setting. On the other hand, the contents of the table 171 may be changed at any time when the system is operating for instance by means of a control IP packets supplied from the control equipment. The reference numeral 172 denotes a condition table of output suppression for indicating conditions ST(11) through ST (1i), - - - ST (N1) through ST (Ni) for stopping the readout of cells from the buffer memory 15 for each service class (CL(1) through CL(i)) and for each output line OUT-1 through OUT-n.

The memory controller 16 reads out cells from the cell queues in the buffer memory 15 by referring to the output sequence formula defined in the table 171 in correspondence with the respective output line numbers so that the stored cells are first read out from the queue with the highest class in the output order of priority sequence. Once all of stored cells are read out from the highest priority queue as to one of output lines, the output line number is changed and next group of stored cells are read out from a queue with the highest class in the output order of priority sequence for the next output line. When all of the highest priority cells were read out by repeating the above operations, then next groups of stored cells are read out from next class queues with the second highest order of priority sequence. By repeating this operation, stored cells can be read out one after another in sequence starting from the highest order of priority to each output line.

On the other hand, the memory controller 16 is periodically checking the congestion notification received from the signal line 19 and if such a cell queue that is transmitting cells to the output line indicated as a congested line is detected in the buffer memory, the memory controller specifies a cell queue to be stopped by referring to the condition table 172 and correlating the congestion status indicated by the congestion indication bits with the condition of output suppression defined in the table 172.

In order to efficiently restrict the cell readout based on the notice of congestion and the condition table 172 in compliance with the order of priority in the table 171, it is convenient to prepare a mini-table for indicating the relation between the packet or queue identifier (output line number and class) and the order in the transmission sequence as to the cell queues present in the buffer memory 15 by referring the priority table 171.

When the notice of congestion is received, output lines on which changes occurred in the congestion state are specified and the mini-table is referred to in order to check whether a line number corresponding to the specified output line (congested lines or lines recovered from congestion) is present or not. If a congested line is found, then the table 172 is referred to and a cell queue, from which the cell transmission should be prohibited or permitted, is specified. According to a preferable embodiment, the mini-table includes transmission prohibiting flags associated with the queue identifiers and the status of transmission prohibiting flags are changed depending upon the congestion status of the output lines so that the actual read out of cells is carried out by referring the mini-table.

According to the present invention, as apparent from the above embodiments, variable length packets received from the input lines are converted into fixed length cells and switched in cell units, and when any one of output lines falls into congested status, the in-flow of cells to the congested line is selectively prohibited depending upon the order of priority. Accordingly, by restricting the forwarding of cells of data packets with a low priority, the delay time required for switching of real time packets with a high priority can be reduced. Further, if a high priority packet has arrived to an input line interface when the input line interface is prohibiting the forwarding of low priority cells to the switch unit, the present invention allows the input line interface to forward the high priority cell to the switch unit while remaining the low priority cells, thereby to change the order of packet forwarding from the switching unit.

What is claimed is:

1. A packet switch connected to a plurality of input lines and output lines for forwarding variable length packets received from each of said input lines to one of said output lines specified by respective header information, said packet switch comprising:

a switch unit, having a plurality of input ports and output ports corresponding to said input lines and output lines, respectively, which outputs fixed length cells received from each of said input ports to one of said output ports specified by routing information contained in the cell header of said received cells;

a plurality of input line interfaces, each connected to one of said input ports, which convert the variable length packets received from one of said input lines to fixed length cells and supply the fixed length cells to the one input port; and a plurality of output line interfaces, each connected to one of said output ports which convert output cells received from the one output port to variable length packets and send out the packets to one of said output lines, wherein each of said input line interfaces has a cell output controller which stores the cells converted from said variable length packets in queues formed for each output line according to a degree of priority of respective cells and selectively forwards the stored cells to said input port according to the degree of priority of the respective cells, wherein each output line interface comprises:

a cell disassembler unit which receives the output cells from one of said output ports and delivers data blocks obtained by removing a cell header from each of said output cells, a buffer memory connected to said cell disassembler unit, a memory controller which stores said data blocks delivered from said disassembler into said buffer memory according to identification information contained in said cell header, and a buffer monitor coupled with said memory controller so as to monitor the data blocks stored in said buffer memory and issue a notice of congestion indicating the cell congestion status, and wherein the cell output controller in each of said input line interfaces selectively prohibits the forwarding of cells according to the degree of priority of the respective cells as to the output lines specified by the notice of congestion.

2. A packet switch according to claim 1, further comprising:

a circuit connected to receive the notice of congestion from said output line interfaces and distribute the notice of congestion to said input line interfaces.

3. A packet switch connected to a plurality of input lines and output lines for forwarding variable length packets received from each of said input lines to one of said output lines specified by respective header information, said packet switch comprising:

a switch unit, having a plurality of input ports and output ports corresponding to said input lines and output lines, respectively, which outputs fixed length cells received from each of said input ports to one of said output ports specified by routing information contained in the cell header of said received cells;

a plurality of input line interfaces, each connected to one of said input ports, which convert the variable length packets received from one of said input lines to fixed length cells and supply the fixed length cells to the one input port; and a plurality of output line interfaces, each connected to one of said output ports which convert output cells received from the one output port to variable length packets and send out the packets to one of said output lines, wherein each of said input line interfaces has a cell output controller which stores the cells converted from said variable length packets in queues formed for each output line according to a degree of priority of respective cells and selectively forwards the stored cells to said input port according to the degree of priority of the respective cells, wherein each output line interface comprises:

a cell disassembler unit which delivers data blocks by removing a cell header from each of said output cells received from one of said output ports, a buffer memory connected to receive said data blocks from said cell disassembler unit, a memory controller which stores the data blocks into said buffer memory forming a plurality of queues according to identification information contained in the cell header, and a buffer monitor coupled with said memory controller to monitor the quantity of data blocks stored in said buffer memory, wherein said packet switch comprises:

a circuit which collects information indicating the quantity of stored cells from each of said output line interfaces and converts the quantity information into control information indicating the congestion status for each output line to notify said input line interfaces of the control information, and wherein the cell output controller of each of said input line interfaces selectively prohibits the forwarding of cells according to the degree of priority of the respective cells as to the output lines specified by a notice of congestion.

4. A packet switch according to claim 1, wherein said notice of congestion includes information indicating degree of congestion for each output line, and said cell output controller determines cell queues to be prohibited from cell forwarding based on the degree of congestion.

5. A packet switch according to claim 1, wherein said cell output controller determines the degree of priority based on service class information contained in the header of said variable length packet.

6. A packet switch coupled to a first group of input lines and output lines for communicating variable length packets, and a second group of input lines and output lines for communicating fixed length cells each having a cell header and a fixed length data block obtained by segmenting a variable length packet, said packet switch comprising:

a switching unit having a plurality of input and output ports which switches the fixed length cells received from said input ports to one of said output ports specified by routing information contained in the cell header of said received cells;

a plurality of first input line interfaces which converts the variable length packets received from said first group of input lines into internal cells of a fixed length and supply the internal cells to a first group of the input ports of said switching unit;

a plurality of second input line interfaces which converts the fixed length cells received from said second group of input lines by header conversion into internal cells of a fixed length and supply the internal cells to a second group of the input ports of said switching unit;

a plurality of first output line interfaces which converts the internal cells received from a first group of output ports of said switching unit into variable length packets and forward the variable length packets to said first group of output lines; and a plurality of second output line interfaces which converts the internal cells received from a second group of output ports into external cells by removing a portion of the cell header from said internal cells and forward the external cells to said second group of output lines, wherein each of said first and said second input line interfaces having a cell output controller which stores the internal cells by classifying into a plurality of queues corresponding to said output lines and selectively output the stored cells to the input port according to the degree of priority of the stored cells.

7. A packet switch according to claim 6, further comprising:

a monitor which detects congestion status of stored cells for each of said output lines within said packet switch and notify the congestion status to said first and said second input line interfaces, whereby said cell output controller selectively prohibits the forwarding of stored cells as to the output lines specified by the notice of congestion.

8. A packet switch according to claim 6, wherein said switch unit comprises a buffer memory for storing the input cells received from said input ports by classifying for each of said output lines, and a buffer monitor which monitors the quantity of stored cells for each of said output lines within said buffer memory and to issue a notice of congestion indicating the congestion status for each of said output lines; and each of said cell output controllers in said first and second input line interfaces selectively prohibits the forwarding of stored cells as to the output lines specified by the notice of congestion, according to degree of priority of said stored cells.

9. A packet switch according to claim 6, wherein each of said first output line interfaces comprises a circuit to output data blocks obtained by removing the cell header from the internal cells received from one of said output ports, a buffer memory to store the data blocks into queues formed according to cell identification information contained in the cell headers associated with the respective data blocks, and a buffer monitor which monitors the quantity of stored data blocks within said buffer memory and issue a notice of congestion indicating the status of congestion, and wherein each output controller in said first and second input line interfaces selectively prohibit the forwarding of cells as to output lines specified by the notice of congestion, according to the degree of priority of said stored cells.

10. A packet switch, connected to a plurality of input lines and output lines for forwarding variable length packets received from each of said input lines to one of said output lines specified by respective header information, said packet switch comprising:

a switch unit, having a plurality of input ports and output ports corresponding to said input lines and output lines, respectively, which outputs fixed length cells received from each of said input ports to one of said output ports specified by routing information contained in the cell header of said received cells;

a plurality of input line interfaces, each connected to one of said input ports, which convert the variable length packets received from one of said input lines to fixed length cells and supply the fixed length cells to the one input port; and a plurality of output line interfaces, each connected to one of said output ports which convert output cells received from the one output port to variable length packets and send out the packets to one of said output lines, wherein each of said input line interfaces has a cell output controller which stores the cells converted from said variable length packets in queues formed for each output line according to a degree of priority of respective cells and selectively forwards the stored cells to said input port according to the degree of priority of the respective cells, wherein said switch unit comprises:

a buffer memory to store the input cells from said input ports in queues formed corresponding to said output lines, and a buffer monitor which monitors the quantity of stored cells for each of said output lines within said queues and to issue a notice of congestion indicating the congestion status for each of said output lines, wherein said cell output controller of each of said input line interfaces selectively prohibits the cell forwarding according to the degree of priority of the respective cells as to the output lines specified by the notice of congestion, and wherein said notice of congestion for each output line, and said cell output controller determines cell queues to be prohibited from cell forwarding based on a degree of congestion.

* * * * *